United States Patent [19]
Rouhani

[11] Patent Number: 5,567,541
[45] Date of Patent: Oct. 22, 1996

[54] METHOD AND APPARATUS FOR MEASURING THE STATE OF CHARGE IN A BATTERY BASED ON VOLUME OF BATTERY COMPONENTS

[75] Inventor: S. Zia Rouhani, Idaho Falls, Id.

[73] Assignee: Lockheed Idaho Technologies Company, Idaho Falls, Id.

[21] Appl. No.: 407,570

[22] Filed: Mar. 21, 1995

[51] Int. Cl.$^6$ .................................................. H01M 10/48
[52] U.S. Cl. .............................. 429/93; 429/61; 429/66; 429/70; 429/90; 429/91
[58] Field of Search ............................. 429/61, 91, 66, 429/70, 90, 93; 73/37.5, 37.9

[56] References Cited

U.S. PATENT DOCUMENTS 5,244,754  9/1993  Bohmer et al. ............................ 429/91

Primary Examiner—Bruce F. Bell
Attorney, Agent, or Firm—Mallinckrodt & Mallinckrodt

[57] ABSTRACT

The state of charge of electrochemical batteries of different kinds is determined by measuring the incremental change in the total volume of the reactive masses in the battery. The invention is based on the principle that all electrochemical batteries, either primary or secondary (rechargeable), produce electricity through a chemical reaction with at least one electrode, and the chemical reactions produce certain changes in the composition and density of the electrode. The reactive masses of the electrodes, the electrolyte, and any separator or spacers are usually contained inside a battery casing of a certain volume. As the battery is used, or recharged, the specific volume of at least one of the electrode masses will change and, since the masses of the materials do not change considerably, the total volume occupied by at least one of the electrodes will change. These volume changes may be measured in many different ways and related to the state of charge in the battery. In one embodiment, the volume change can be measured by monitoring the small changes in one of the principal dimensions of the battery casing as it expands or shrinks to accommodate the combined volumes of its components.

16 Claims, 3 Drawing Sheets

METHOD AND APPARATUS FOR MEASURING THE STATE OF CHARGE IN A BATTERY BASED ON VOLUME OF BATTERY COMPONENTS

CONTRACTUAL ORIGIN OF THE INVENTION

The United States Government has rights in this invention disclosed under contract number DE-AC07-94ID13223 with Lockheed Idaho Technologies Company.

BACKGROUND OF THE INVENTION

1. Field

The invention is in the field of methods and apparatus for determining the remaining charge or useful life (state-of-charge) of an electrochemical battery.

2. State of the Art

Primary electric batteries of different kinds are used for generation of electricity through conversion of chemical energy, from the reaction of their electrodes with the electrolyte solution, into electric current with a certain voltage. Once the reactive mass of the electrodes or the electrolyte is depleted, these batteries are finished and must be replaced. Secondary batteries that can be recharged after depletion are capable of delivering considerable amounts of electricity with high currents and are used in a wide variety of applications. In these batteries, the chemical energy from the reactions between the electrodes and the electrolyte that is spent on producing electricity, can be replenished by reversing the chemical reactions on the electrodes during a recharging process that involves passing an electric current, from another source, through the battery in the reverse direction.

A common feature of most electric batteries is their relatively constant voltage during use. The voltage is not usually dependent on the battery's charge content so an instantaneous measurement of a battery voltage does not relate to the quantity of charge remaining in the battery. Only when the battery gets close to being completely discharged does its voltage start to drop off noticeably. In other words, the battery voltage is not a reliable indicator of its energy content. This is particularly true in some lithium batteries. It is desirable in many cases, and in some situations it is essential, to know exactly how much energy is available in a battery system at any instant during its use. For these reasons, the subject of indicating the remaining charge in electric batteries has received the attention of many inventors and there are a large number of patents dealing with "state-of-charge" indicators for batteries. Examples are U.S. Pat. Nos. 3,484,681, 3,617,850, 3,895,284, 3,898,548, 3,906,329, 4,307,330, 5,315,228, and 5,315,253.

Most of the devices described in the prior art patents measure the electrical signals of a battery cell or measure charging current into a battery and current taken from the battery and, using them in a variety of procedures, estimate how much electric charge is left in the battery at any moment. Examples include measurements of voltage and time-integrated currents that pass through the battery, in charging and discharging situations, along with temperature measurements for applying necessary correction factors. A common disadvantage of most of these patented methods and devices is the necessity of continuously monitoring the current flow into or out of the battery and keeping track (electronic book-keeping) of the past current history of the battery. Further, none of them is a truly instantaneous charge indicator. Another disadvantage of these methods is that they will never be cost effective for usage on very small batteries, known as dry cells, that are used extensively in many instruments and household equipment.

There remains a need for an accurate and inexpensive solution for measuring the charge in a battery that can be applied to different types of batteries and provide an instantaneous read-out of the state of charge in a battery.

SUMMARY OF THE INVENTION

All electrochemical batteries produce electricity through a chemical reaction between an electrolyte in the battery and at least one electrode in contact with the electrolyte, or through a chemical reaction between two electrodes of the battery through an electrolyte substance in the battery. As the chemical reactions take place, the composition of the electrodes and, in some cases, even the electrolyte, changes and, as a result, the densities and total volume of the reacting materials will alter. The volume change is a natural consequence of the difference in the specific densities of the chemical components before and after their reactions. Through these reactions, the total volume of the reacting materials (reactive masses), changes gradually from one value at the start of a battery life to another value at the end of its useful life. The change takes place in a substantially linear fashion as the battery discharges from its substantially fully charged condition to its functionally discharged condition. If the battery is a rechargeable one, the chemical reactions are reversed during recharging so that the volume changes of the reactive masses are reversed and the total volume of the reactive masses moves back toward the value it had when fully charged.

According to the invention, the amount of charge in a battery at any time can be determined by measuring a parameter that is related to the total volume of the reactive masses inside the battery at that time and relating the value of the measured parameter to the value of the same parameter when the battery is substantially fully charged and its value when the battery is functionally discharged. Where the value of the measured parameter falls between the fully charged and functionally discharged values indicates the amount of charge remaining in the battery. For example, if the measured parameter value falls half way between the value of the parameter when the battery is fully charged and the value of the parameter where the battery is functionally discharged, the battery has about one half of its normal charge remaining.

Since there are numerous ways in which to obtain an indication, directly or indirectly, of the total volume of the components or reactive masses in a battery at a particular time and relate it to the fully charged and functionally discharged volumes, the invention may be implemented in a variety of ways. Thus, there are a number of different battery parameters that change as a result of a change in reactive masses volume and which can be measured to provide an indication of change in the battery charge content. The parameter measured may be the differential excess volume created, or eliminated, during a discharge, or while recharging, and a device for indicating the incremental volume changes may be included inside a battery casing. Alternatively, the measured parameter may be incremental changes in a principal dimension of a battery, such as the total length or circumference of its casing. Since volume of most substances change with temperature, a temperature dependent correction factor must be applied to the measured changes in a battery's dimension or volume that is related to the state-of-charge in the battery.

DRAWINGS

The best mode presently contemplated for carrying out the invention is illustrated in the accompanying drawings, in which.

DETAILED DESCRIPTION OF THE ILLUSTRATED EMBODIMENT

Figure 1:
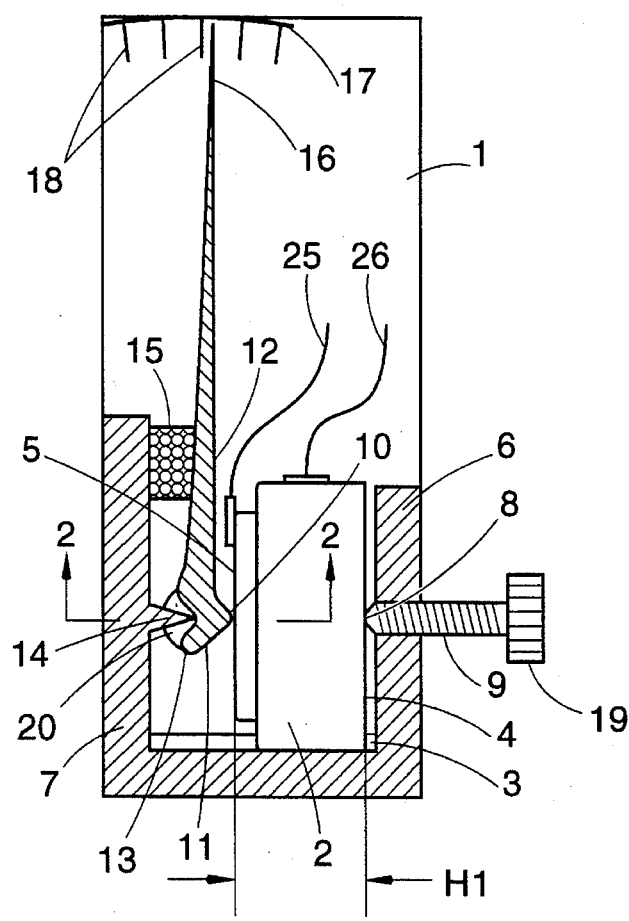
FIG. 1 is a schematic vertical section of a device of the invention for measuring the charge of a battery based on variations in the battery length.

Generally, all electrochemical batteries, regardless of the actual materials used for the electrodes or the electrolytes, provide electricity as a result of chemical reactions between the electrodes and the electrolyte. Examples of common electrochemical batteries are: zinc-manganese dioxide or zinc-silver oxide combinations used in small size batteries, and nickel-cadmium and lithium cells of different kinds used in a variety of battery types of different sizes. The specific chemical reactions that take place during discharge, or recharging, are quite different in different batteries. However, all the reactions involve chemical changes in the reactive masses of the electrodes and these chemical changes are generally accompanied by some changes in specific volumes of the reacting masses. The variations in specific volumes expand the battery ingredients in all possible directions inside the casing and produce considerable changes in the total volume of the reactive masses in the battery. The present invention uses the total volume changes to gauge the state of charge in the battery. The incremental changes of the total volume can be measured in a number of different ways and correlated with the remaining charge in the batteries. As described with a few examples below, this process can be applied to almost all types of primary and secondary electrochemical batteries in a variety of embodiments that may be different for different batteries, and it can be readily used for measuring the state of charge in some of the presently manufactured dry cell batteries.

The basic principle upon which the invention is based can be quantitatively expressed by the following example: In an ordinary alkaline dry-cell battery, metallic zinc (powder) is used for the anode and a mixture of manganese dioxide, $MnO_2$, with other filler materials is used for the cathode with an alkaline gel as the electrolyte. When the battery is fresh, the zinc material has a specific volume of 0.14 cubic centimeter per gram (cc/g) but, after oxidation during discharging, its specific volume increases to 0.178 cc/g. That means the reactive mass of zinc will require 2.7% more volume in the oxide form as the battery discharges. Meanwhile, the specific volume of the $MnO_2$ in the cathode increases from 0.199 cc/g to 0.222 cc/g for $Mn_2O_3$, which is produced by the chemical reaction. By considering the weight proportion of these materials in the battery, one can calculate a total relative volume increase of 14.2% for the anode and the cathode in the battery. Volume changes of this kind may be calculated for all chemical substances used in various batteries and the relative volume changes may be considerably larger or smaller. In some cases, the actual volume change may be negative. An example of this negative change is a battery with a lithium anode that employs fluorine as the reactive agent. In this type of battery, the anode volume shrinks as the battery discharges because pure lithium takes up 16.7% more volume than does lithium fluoride (LiF) that contains that same amount of lithium. The volume reduction may also take place during a recharging process. Large volume changes of this kind are considered undesirable in designing various batteries and their effect is intentionally compensated for by building in expansion volumes or some porosity in the battery materials for taking up the volume increases, and also, for accommodating gases that evolve during the reactions in some batteries. However, in some of the commercially available sealed batteries, this compensation is not one hundred per cent and, as a result, there are small changes in at least one dimension of the battery casing that can be measured and related to the state of charge in the battery.

The present invention can be implemented in the following ways:

A. By using sensitive means of measuring a specific dimension, such as length, of an existing battery and relating the measured dimensional changes therein with the state of charge in the battery. Measurement of that dimension then indicates the state of charge of the battery.

B. By adopting a particular battery design and material selection that produces easily measurable changes in at least one dimension of the battery casing as the battery is used.

C. By building into a battery specially designed means of indicating volume changes inside the battery casing that can be sensed from outside the battery casing such as by being observed through a small transparent window in the sealed battery casing, or through the extent of a small protrusion that extends outside of the battery casing.

A variety of embodiments may be used in any of these areas, but the characteristic feature of the invention in all of those embodiments is the same, that is, measuring the state of charge in a battery based on a parameter that is affected by changes in the volume of the battery's reactive masses.

Following are a few examples of the many possible embodiments of this invention.

One of the commonly used small batteries is the so called button size battery that is widely used in watches and in many other kinds of electronic devices. The chemical compositions, voltages, and the energy contents of these batteries may vary between different brands but, their general appearance may be common for any specific application. These batteries are made as a very short cylinder whose outer dimensions can be defined in terms of its diameter and its total height, H1, FIG. 1. The anode connection, the top side, and cathode connection, the bottom side, of these batteries are flat when the battery is fresh. The mechanical connection between the anode top and the cathode base is through an insulating grommet that holds the top and the bottom parts of the battery casing together. For some brands, when a battery of this shape is put to use, the height H1 starts to change, albeit very slightly. This change is a result of gradual volume variations of the reactive masses inside the battery casing and it takes place either through dimensional changes in the grommet (insulator), or through some slight bulging of the bottom plate of the battery. In either case, according to the present invention, these small incremental changes in H1 can be measured to reflect the extent of reactions inside the battery and, hence, the amount of electricity that has been drawn from it, or the chemical aging that has taken place inside the battery. With some testing and calibration on similar batteries, the measurement of these small changes can be used as a measure of how much energy is left in the battery before it is functionally depleted. By functionally depleted or functionally discharged it is meant that the battery is no longer usable for a particular purpose for which the battery is to be used. Obviously, measurement of variations in H1 can be done in many different ways. A very simple way is to use a micrometer or a precision caliper with an electrically insulated contact face to measure the instantaneous length of H1. By comparing the measured value of H1 at any time, H1t, with an initial value of H1 when the battery was fresh, H1i, and another value of H1 measured on a similar battery when it became functionally depleted, H1d, it will be easy to estimate what fraction of the useable energy is left in the battery at that time, according to the following relation:

$$E=100.0 \times (H1t-H1d)/(H1i-H1d),$$

where E is the percentage of the initial energy that is available in the battery. It may be necessary to use some additional factors in this equation if, for example, the relationship between E and H1 is not quite linear. For instance, E may vary as a function of $[1/(H1i-H1d)]$ raised to some power. Only laboratory tests on each brand can determine the suitable formula for determining E based on the measured values of H1. In any case, a sensitive length measuring device can be calibrated to show the state of charge, E, at one glance, regardless of the mathematical relationship between the measured H1t and E.

Figure 2:
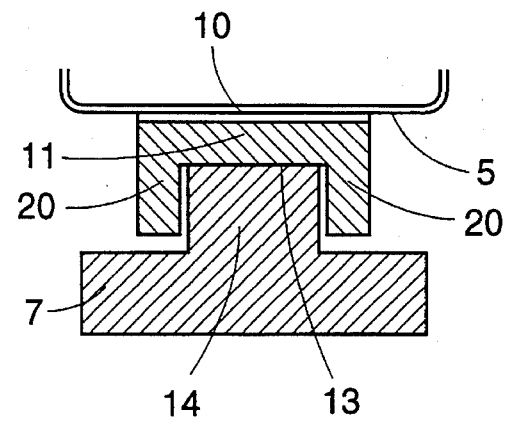
FIG. 2 is a horizontal section through the pivot arm of the device taken on the line 2—2 of FIG. 1.

In a particular embodiment for this purpose, the small variations in H1 can be measured by mechanical movements that amplify the small changes in H1 and use an indicator handle or pointer arm, whose tip moves alongside a graded arc, or a linear scale, with numbered markings that are calibrated according to the state of charge for each position of the indicator handle along that arc or scale. FIGS. 1 and 2 show an example of such an embodiment. The battery gauge 1 receives and holds battery 2 on a curved receiving surface 3 which forms a cradle for the battery inside an opening between two walls 6 and 7 such that the approximate mid-point of said battery's bottom plate 4 comes to rest against the tip point 8 of a small adjustable screw 9 that goes through wall 6. The battery's top plate 5 is in contact, along its approximate center line, with the ridge 10 of a sharp bend 11 at the lower end of an indicator handle or pointer arm 12 that is held in position by a wedge 14, attached to wall 7, whose sharp edge 13 fits inside the groove of bend 11, and the cushioning pressure of an elastic material 15 that is affixed to wall 7 on one side and to handle 12 on the other side. Sharp edge 13 is slightly below the position of ridge 10 to provide a pivoting axis for the handle 12. In this arrangement, any changes in the height (or thickness) H1 of battery 1 will move the resting point of ridge 10 against top plate 5 and this will create a rotational displacement of handle 12 around the sharp pivot edge 13. In effect, the lower portion of handle 12 forms a link between the top plate 5 and the sharp pivot edge 13 and the movement of the top plate 5 in relation to sharp pivot edge 13 changes the angular orientation of the link. A change in the angular orientation of the link changes the position of the handle or pointer arm 12. The elastic material 15 yields to allow for movement of handle 12 while still forcing handle 12 to remain in contact with top plate 5. A rotational displacement of handle 12 moves its small tip 16 along a graded arc or scale 17 with markings 18 that are calibrated to show the remaining charge in battery 1 for each position that is dictated by its height H1. The small screw 9 can be turned by its end knob 19 for zero setting of the position of handle tip 16 for any fresh battery. This makes the instrument useful for batteries of the same type that may show some statistical variations in their initial heights. In order to prevent lateral displacements of handle 12 against wedge 14, a small lateral wall 20 is built on each side of the lower end of the handle at the lateral ends of the groove of bend 11, as shown in FIGS. 1 and 2. A battery gauge such as shown in FIGS. 1 and 2 can be used even when the battery is in use, if flexible contacts 25 and 26 are attached to its opposite poles as shown schematically in FIG. 1.

Figure 3:
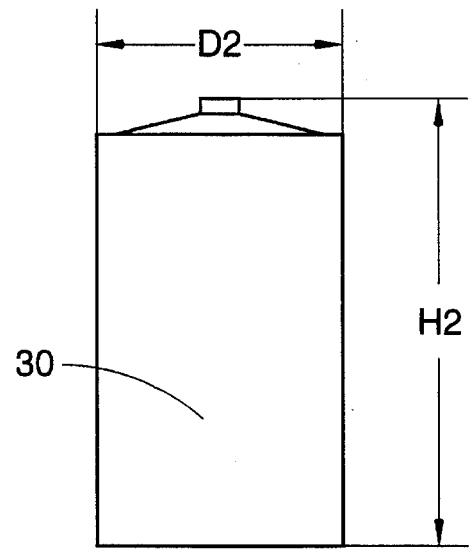
FIG. 3 is a side elevation of a cylindical dry cell battery indicating its principal length.
Figure 4:
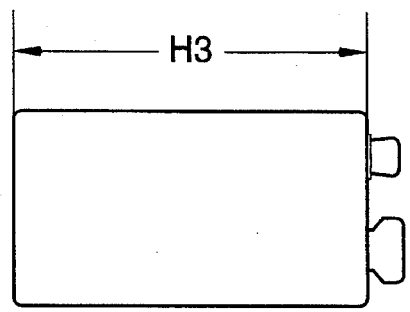
FIG. 4 is a side elevation of a flat-cell battery indicating its principal length.

Similar length measurements and length monitoring to determine charge of a battery may be used with several other types of commonly used dry cell batteries. These include any of the cylindrical batteries known as AAA, AA, A, B, C, or D, as well as the 9-Volt prismatic batteries with rectangular cross section, known as flat-cell battery. The only difference in the case of each one of these is the size or the total length of the battery that must be accommodated in the cavity of the measuring device. FIG. 3 shows a cylindrical battery 30 whose outside dimensions can be defined in terms of its outside diameter D2 and its total length H2. This could represent any of the battery sizes AAA, through D, or any other cylindrical battery. For some brands of these batteries, the total length H2 increases slightly as the cell is discharged. Elongations of up to 0.5% have been measured for a discharge of about 50% in some of these batteries. The apparatus shown in FIG. 1 and described for button size batteries may be used, with a wider gap between walls 6 and 7 to accommodate length H2 of such a battery, for measuring the state of charge in these batteries. FIG. 4 shows the longitudinal side of a flat-cell battery that has a rectangular shape on each side. The total length of this battery, which is marked H3 in FIG. 4, does show some elongation as a function of discharge for some brands of these batteries. Here again, variations of this length can be employed to determine the remaining charge in the battery.

Some rechargeable batteries, like nickel-cadmium batteries, are made of long strips of anode and cathode that are separated from each other by a layer of an electrolyte carrying material. The anode, cathode, and electrolyte carrying material are all rolled together in a spiral form, which is fitted inside a cylindrical container. As these batteries are charged and discharged their material densities change which can affect the outside dimensions, i.e., length and diameter or circumference, of the cylindrical container, provided that the casing material has some elasticity. By manufacturing the container of some resilient material, it will be relatively easy to gauge the state of charge in these batteries by measuring the outside length of, or by measuring the circumference of, the container and correlating that length or circumference with the state of charge in the battery.

Figure 5:
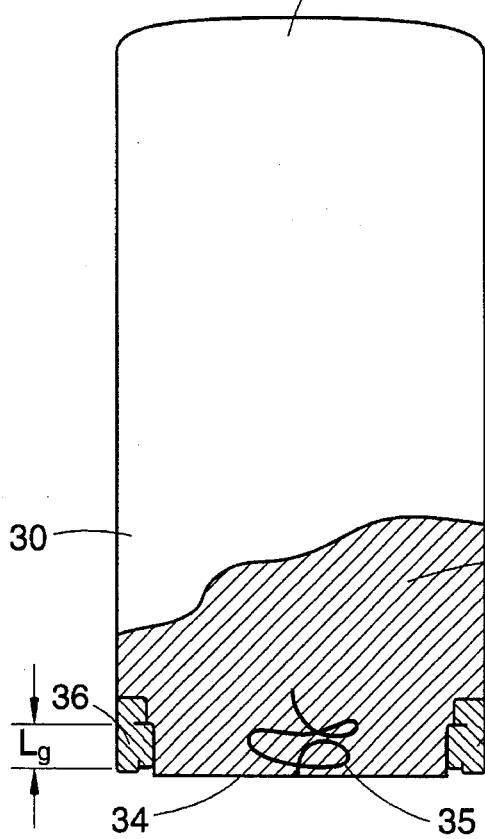
FIG. 5 is a side elevation of a battery equiped with a moving bottom plate showing the lower portion of the battery and mvoing plate in section.

According to this invention, a battery of any shape or size, except some batteries with fluid or gaseous components, can be designed to produce measurable displacements in at least one member of its casing walls as a function of volumetric changes in its reactive masses and, as described above, such dimensional changes can be advantageously utilized to measure the state of charge in the battery. In the arrangement of FIG. 5, the casing of a cylindrical dry cell battery 30 is made of a sturdy cylindrical shell 31 that is manufactured in one piece with the top end 32 of the cylinder. Said cylindrical shell 31 contains all the internal components 33 of the battery, including its reactive masses. At the lower end, the cylindrical shell 31 is closed with a metallic disc 34 that can be the anode cap of the battery and have a flexible electrical connection 35 with the anode inside the battery. Metallic disc 34 is held in place and electrically insulated from the cylindrical shell 31 by a resilient grommet 36. Grommet 36 has a sufficient length Lg to allow a measureable displacement, in the order of one or a few milimeters, for the bottom plate 34. As the reactive masses inside battery 30 change in volume, due to either the discharging or recharging process, the bottom plate 34 moves proportionally and the incremental displacements of this plate with respect to the casing shell 31 can be measured and correlated with the state of charge in battery 30.

In addition to mechanical devices with a dial and indicator handle, one can also use electrical means, in the form of elongation sensitive resistors, or strain-gauges, for determining changes in the length or the outside circumference of a battery. There are many length measuring techniques of this kind that are used in industrial practices and they need not be explained in detail here.

Special optical devices may also be used to observe the volume changes inside a battery, or to indicate or trace variations in a specific length on the outside of a battery casing. Following are two examples of such optical devices and their implementation as a part of this invention.

Figure 6:
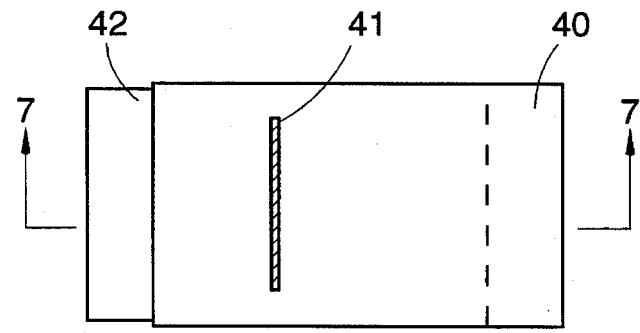
FIG. 6 is a top plan view of two thin plates for optical indication of small relative displacements.
Figure 7:
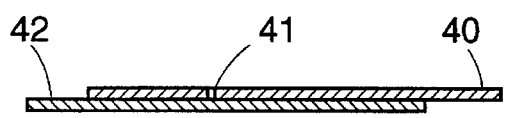
FIG. 7 is a vertical section of the thin plates taken on the line 7—7 of FIG. 6.
Figure 8:
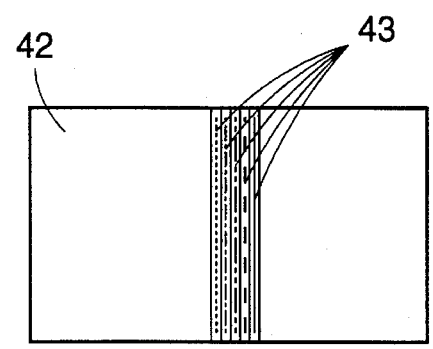
FIG. 8 is a top plan view of just the lower plate of the plates of FIGS. 6 and 7 showing different thin parallel stripes for indicating relative displacement of the plates.

FIGS. 6 and 7 show two overlapping thin layers of material 40 and 42 in an enlarged scale. The top layer 40 is completely opaque except for a very narrow transparent, or open, window or slit 41 that is only a fraction of a mm wide, and allows visibility of an area of that same width on the lower layer 42. The lower layer 42 is painted with a number of very thin parallel markings in the form of stripes 43 in different colors, as indicated by different line types in FIG. 8. The two layers 40 and 42 are in contact with each other and either one or both of them are strapped to a mechanism that slides them against each other as a direct result of length changes in a certain dimension of a battery. The direction of movements of layers 40 and 42 is preferably at right angles to the transparent slit 41 and the colored stripes 43. The window or slit 41 acts as a register means which cooperates with the markings 43 on the lower layer 42 so relative movement of the two layers can be easily determined. In the embodiment shown, the width of the transparent slit 41 is enough to show only the color of one of the color stripes 43 on the lower layer 42 and, as the two layers slide slight relation to one-another, one colored stripe vanishes as a new color stripe appears under the opening 41. The colored stripe showing through the slit indicates the relative positions of the layers 40 and 42 and serves as a measure of length or change of length.

Figure 9:
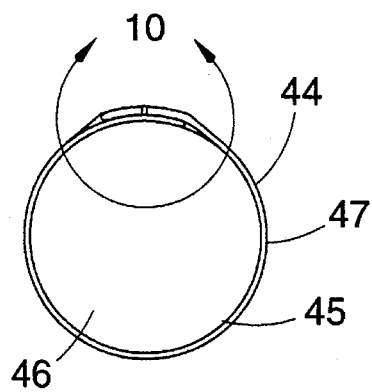
FIG. 9 is a schematic view of a thin belt around the circumference of a cylindrical battery that measures changes in the circumference of the battery.
Figure 10:
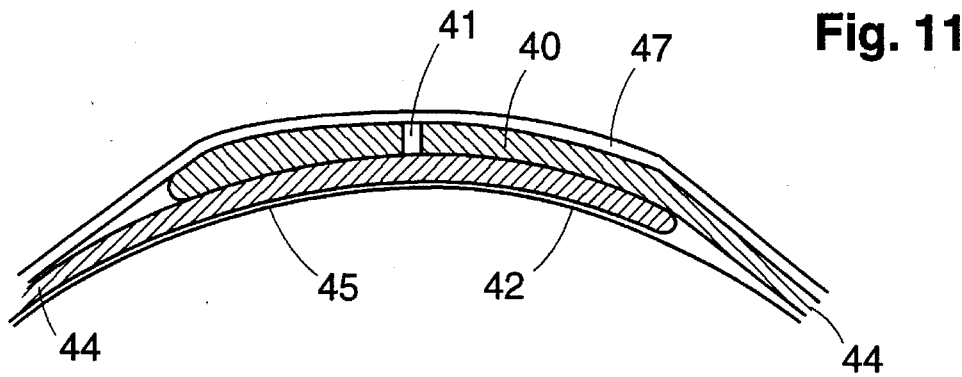
FIG. 10 is a fragmentary enlarged vertical section of the measuring portion of the belt of FIG. 9.

FIGS. 9 and 10 show an embodiment of a mechanism for indicating the state of charge in a battery through the use of two sliding layers 40 and 42, including a sliding window or slot 41 in layer 40 above the stripe-painted surface of layer 42. The relative positions of the layers are affected by dimensional changes in a battery 46. According to FIG. 9, such a mechanism can be a belt-like thin strap 44 of a non-elongating material terminating at each end in a termination layer of material identical to the described layers 40 and 42 and thus similarly labeled 40 and 42. The belt-like strap 44 is placed snugly around the cylindrical casing 45 of battery 46 with end layer 40 overlying end layer 42 as shown in FIG. 10. In order to hold the two layers 40 and 42 in contact with each other and keep strap 44 firmly in place, an outer band 47 of an elastic and transparent material is drawn on top of them around the battery casing 45. In order to read the state of charge in battery 46, the positioning of the colored stripes 43 on layer 42 can be arranged such that when the battery is fully charged a green or white stripe appears under the transparent window or slit 41, and when the battery is functionally discharged a red or black color stripe becomes visible, with stripes of other colors filling the space between those limits.

Figure 11:
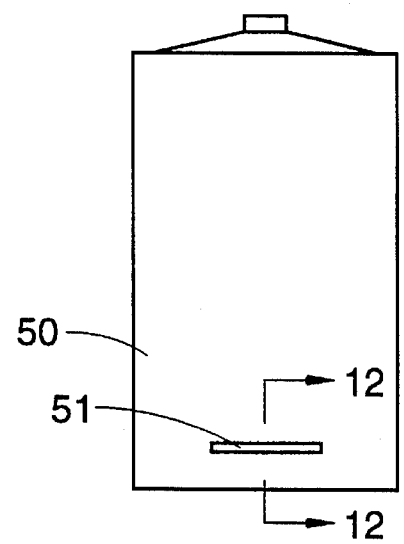
FIG. 11 is a side elevation of a battery with an indicator of the invention near the lower end thereof.
Figure 12:
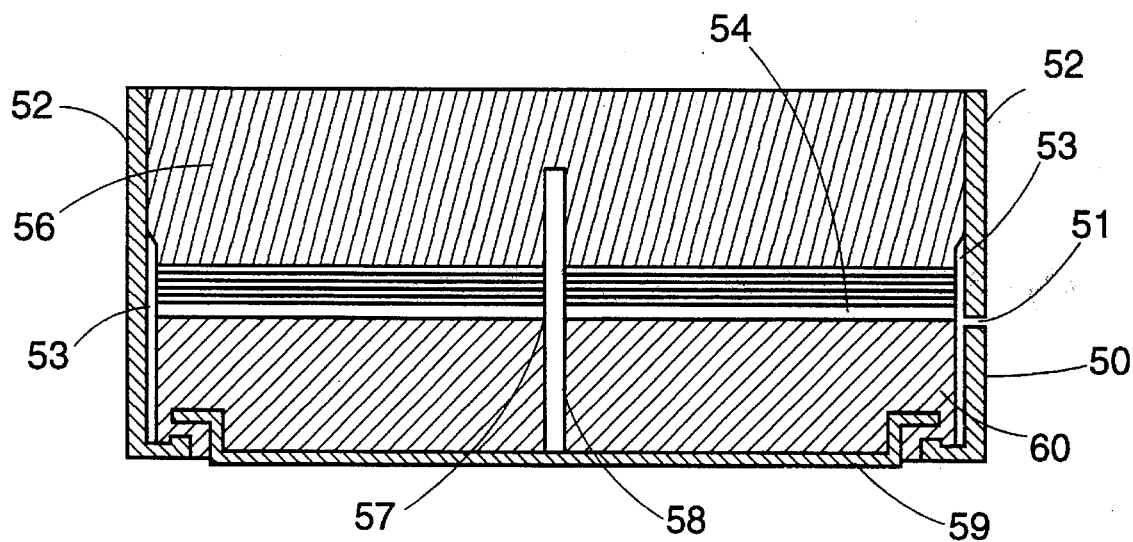
FIG. 12 is a fragmentary enlarged vertical section of the lower portion of the battery taken on the line 12—12 of FIG. 11.

The same principle of changing markings or color stripes under a narrow window or slit can be employed inside a battery for displaying its state of charge without any need for additional instruments. FIG. 11 shows the outside of a cylindrical battery 50 that is built with a narrow transparent window 51 close to its bottom end. An enlarged cross-section of the internal arrangement of the battery in the vicinity of this window is shown in FIG. 12. The transparent window 51 is formed by a thin cut in the metallic casing 52 of the battery and is filled by a transparent material 53 that extends over a wider region inside the metallic casing in order to provide strength and sealing against internal pressure or leakage of electrolyte. A tightly fitting planar washer 54 that is composed of thin layers of a suitable material in different colors is located inside the battery such that the color of its lowest layer is visible through the window 51 when the battery is in its fresh state. The space above washer 54 is filled with the regular electrode and electrolyte masses, collectively indicated as 56, which are arranged just as in any regular battery of this kind. In its inner area, washer 54 has an opening 57 through which an electric conductor rod 58 is passed for connecting the anode plate 59 to the anode mass inside the battery. The small space below washer 54 contains a supporting ring 60 that is made of a resilient material and allows for axial movements of washer 54 subject to volume changes in the battery's reactive masses 56. In this arrangement, assuming that the reactive masses in battery 50 expand in volume as it discharges, the multi-colored layers of washer 54 will be successively passing down by the transparent window 51 as the battery discharges, and for each state of charge in the battery, a specific color layer of washer 54 will be visible through window 51. If battery 50 is rechargeable, then the recharging process will cause a shrinking of the volume of reactive masses 56, as a result of which, the resilient force of the supporting ring 60 will push the multi-layered washer 54 inward into the battery. In this process, the colored layers of washer 54 will pass by the narrow window 51 in the reverse order of the discharging process and finally once again show the color for the fully charged state of the battery. In this manner, battery 50 will be self contained regarding its state of charge indicator. In a variation of this same embodiment, one may include two or more of said windows 51 around the periphery of battery casing 52.

There are many other optical methods for visualization of very small changes in a volume or a length that can be employed in different embodiments of the present invention. Among these are use of special materials that change color under mechanical tension, or use of a colored fluid that could be squeezed from a tiny elastic container into a capillary transparent tube, either straight as in medical thermometers, or bent in an arc, etc. However, regardless of the means of determination of the volume change, application of any such device for tracing the volume change in a battery for the purpose of determining its state of charge would still represent another embodiment of the present invention.

In any embodiment of this invention, the effects of temperature on the volume of the battery components must be considered and a temperature dependent correction factor must be applied to the measured dimension or volume that is representative of the state of charge in the battery. Such a correction factor takes into account the volume or dimension changes due to the difference in the actual battery temperature at the time of state-of-charge measurement with the battery temperature when the same volume or dimension was measured on the fully charged or functionally discharged battery. As an example, for embodiments that use a display scale for measuring changes in a dimension of the battery, a number of parallel grading lines could be used with markings for different temperatures.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for determining the charge of a battery that generates electricity through a chemical reaction which takes place within the battery and changes the volume of reactive masses in the battery, wherein the battery includes an exterior casing, and wherein the changes in the volume of reactive masses in the battery cause a change in a physical parameter of the exterior case of the battery, comprising means for receiving the battery and for measuring a physical parameter of the exterior case of the battery that changes as the volume of the reactive masses in the battery changes, and means for relating the measured value of the parameter to the value of the parameter when the battery is fully charged and the value of the parameter when the battery is functionally discharged to thereby indicate the charge of the battery.

2. Apparatus for determining the charge of a battery according to claim 1, wherein the parameter of the exterior casing of the battery that changes as the volume of the reactive masses in the battery changes is a physical dimension of the exterior casing, and the means for measuring the parameter is means for measuring the physical dimension.

3. Apparatus for determining the charge of a battery according to claim 2, wherein the battery has a cylindrical exterior casing with substantially flat ends with a distance between the ends, the physical dimension that changes with changes in volume of the reactive masses is the distance between the ends, and the means for measuring the physical dimension measures the distance between the ends.

4. Apparatus for determining the charge of a battery according to claim 3, wherein the means for measuring the distance between the ends includes a cradle to receive the cylindrical casing, a stationary contact to position one end of a battery received in the cradle, and indicator means for indicating the position of the other end of the battery.

5. Apparatus for determining the charge of a battery according to claim 4, wherein the indicator means includes a link having one end in contact with the other end of the battery and another end pivotally mounted in relation to the battery, the angular orientation of the link being indicative of the distance between the ends of the battery.

6. Apparatus for determining the charge of a battery according to claim 5, wherein the link has a pointer arm extending therefrom, the position of the pointer arm indicating the angular orientation of the link, and a scale in association with the pointer arm, the scale indicating the expected position of the pointer when a battery being measured is fully charged, and the expected position of the pointer when a battery is functionally discharged, the actual position of the pointer between the indicated fully charged and functionally discharged positions indicating the measured charge of the battery.

7. Apparatus for determining the charge of a battery according to claim 6, wherein the distance between the ends of the battery that changes with changes in volume of the reactive masses is the distance between approximate midpoints of the ends, the stationary contact positions the approximate mid-point of the one end of the battery received in the cradle, and the one end of the link is in contact with the approximate mid-point of the other end of the battery.

8. Apparatus for determining the charge of a battery according to claim 2, wherein the battery has a cylindrical exterior casing, said cylindrical casing having a circumference, the physical dimension that changes with changes in volume of the reaction masses is a circumference, and the means for measuring the physical dimension measures that circumference.

9. Apparatus for determining the charge of a battery according to claim 8, wherein the means for measuring a battery circumference includes belt means extending around a desired circumference, said belt means including a lower belt termination means at one end of the belt means, and an upper belt termination means at the opposite end of the belt means, said upper belt termination means overlaying at least a portion of the lower belt termination means when the belt means extends around a circumference of the battery, and indication means associated with and operative between the lower and upper belt termination means to indicate the relative position of the upper belt termination means with respect to the lower belt termination means to thereby provide a measurement of the desired circumference and an indication of charge of the battery.

10. Apparatus for determining the charge of a battery according to claim 9, wherein the indication means includes markings on the lower belt termination means, and register means associated with the upper belt termination means which cooperates with the markings to provide a measurement of the incremental changes in circumference.

11. Apparatus for determining the charge of a battery according to claim 10, wherein the register means is a slit, and the relative position of the slit in relation to the markings provides a measurement of the incremental changes in circumference.

12. A battery that includes electrodes and electrolyte for generating electricity through a chemical reaction which takes place within the battery and changes the volume of the reactive masses in the battery, comprising battery structure including battery electrodes and electrolyte for generating electricity through a chemical reaction; at least two battery casing parts, one part movable in relation to the other so that the one part moves in relation to the other as the volume of the reactive masses in the battery increases or decreases; and markings on at least one of the at least two battery casing parts, the markings, in association with the relative position of the two parts being indicative of the volume of the reactive masses in the battery and the charge of the battery.

13. A battery that includes electrodes and electrolyte for generating electricity through a chemical reaction which takes place within the battery and changes the volume of the reactive masses in the battery, comprising battery structure including battery electrodes and electrolyte for generating electricity through a chemical reaction; battery casing means including a cylindrical portion, wherein the cylindrical portion includes two overlapping wall portions, and wherein one of the overlapping wall portions moves in relation to the other overlapping wall portion as the volume of the reactive masses in the battery increases or decreases; and markings on one of the overlapping wall portions which, in association with the relative positions of the two overlapping portions, indicates the charge of the battery.

14. A method for determining the amount of charge in a battery that generates electricity through a chemical reaction which takes place within the battery and changes the volume of reactive masses in the battery, wherein the battery includes an exterior casing, and wherein the changes in the volume of reactive masses in the battery cause a change in a physical parameter of the exterior casing of the battery, comprising the steps of measuring from outside the battery a parameter of the exterior casing of the battery that changes as the volume of the reactive masses in the battery changes, and relating that measurement to the value of the parameter when the battery is fully charged and the value of the parameter when the battery is functionally discharged to thereby determine the charge of the battery.

15. A method for determining the amount of charge in a battery according to claim 14, wherein the battery has a case with a length, the parameter of the battery that changes as the volume of the reactive masses in the battery changes is the length of the battery case, and the step of measuring a parameter is the step of measuring the length of the battery case.

16. A method for determining the amount of charge in a battery according to claim 14, wherein the battery has a cylindrical case with a circumference, the parameter of the battery that changes as the volume of the reactive masses in the battery changes is a circumference of the battery case, and the step of measuring a parameter is the step of measuring the circumference of the battery case.

* * * * *